(12) United States Patent
Chiu et al.

(10) Patent No.: US 8,997,025 B2
(45) Date of Patent: Mar. 31, 2015

(54) METHOD, SYSTEM AND COMPUTER READABLE MEDIUM FOR DOCUMENT VISUALIZATION WITH INTERACTIVE FOLDING GESTURE TECHNIQUE ON A MULTI-TOUCH DISPLAY

(75) Inventors: Patrick Chiu, Menlo Park, CA (US); Chunyuan Liao, Mountain View, CA (US); Francine Chen, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 699 days.

(21) Appl. No.: 12/954,581

(22) Filed: Nov. 24, 2010

(65) Prior Publication Data

US 2012/0131516 A1    May 24, 2012

(51) Int. Cl.
*G06F 3/0488* (2013.01)
*G06F 3/01* (2006.01)

(52) U.S. Cl.
CPC ............ *G06F 3/04883* (2013.01); *G06F 3/017* (2013.01); *G06F 2203/04808* (2013.01)
USPC ........................................ 715/863; 345/173

(58) Field of Classification Search
USPC ......................................................... 715/863
See application file for complete search history.

(56) References Cited

U.S. PATENT DOCUMENTS

| | | | |
|---|---|---|---|
| 6,924,822 B2* | 8/2005 | Card et al. | 345/660 |
| 7,479,949 B2 | 1/2009 | Jobs et al. | |
| 7,610,563 B2* | 10/2009 | Nelson et al. | 715/839 |
| 8,065,603 B2* | 11/2011 | Gossweiler et al. | 715/227 |
| 8,209,628 B1* | 6/2012 | Davidson | 715/790 |
| 8,669,955 B2* | 3/2014 | Nishio et al. | 345/173 |
| 2003/0179234 A1* | 9/2003 | Nelson et al. | 345/764 |
| 2008/0259057 A1* | 10/2008 | Brons | 345/184 |
| 2008/0309632 A1 | 12/2008 | Westerman et al. | |
| 2010/0031202 A1* | 2/2010 | Morris et al. | 715/863 |

OTHER PUBLICATIONS

Hinckley et al, "Pen + Touch = New Tools," Oct. 6, 2010, ACM New York, NY, USA (2010), pp. 27-36.*
Malik et al, "Interacting with Large Displays from a Distance with Vision-Tracked Multi-Finger Gestural Input," Oct. 27, 2005, ACM 1-59593-023-X/5/0010, UIST '05, pp. 43-52.*
Elmqvist, N. et al., Melange: Space Folding for Multi-Focus Interaction. (2008), pp. 173-176, Proceedings of CHI, Florence, Italy.
Ioffe, S., Red Eye Detection with Machine Learning, (2003),.vol. 2, pp. 871-874, ICIP '03, San Jose, California, USA.
MacKinlay, J.D, et al., The Perspective Wall: Detail and Context Smoothly Integrated, (1991), pp. 173-176, Proceedings of CHI '91, Palo Alto, California. USA.
O'Gorman, L. et al., Document Image Analysis. (1995), pp. 161-163, IEEE Computer Society Press, Los Alamitos, California USA.
Perceptive Pixel—http://www.perceptivepixel.com (link visited Nov. 23, 2010), Perceptive Pixel, Inc.

(Continued)

*Primary Examiner* — Alvin Tan
(74) *Attorney, Agent, or Firm* — Sughrue Mion, PLLC

(57) ABSTRACT

A method, system and computer readable medium for folding a document page object are provided. A method for folding a document page object in a graphical user interface using multi-touch gestures includes establishing at least two contact points on a display; moving at least one of the two contact points to create a fold on the document page object; and displaying the folded document page object.

17 Claims, 21 Drawing Sheets

(56) References Cited

OTHER PUBLICATIONS

Reisman, J.L., et al., A Screen-Space Formulation for 2D and 3D Direct Manipulation, (2009), pp. 69-78, Proceedings of UIST '09, British Columbia, Canada.

Shafait, F, et al., Performance Evaluation and Benchmarking of Six Page Segmentation Algorithms,(2008), IEEE Trans. on Pattern Analysis and Machine Intelligence, 30 (6): 941-954, Jun. 2008, Germany.

Wang, L. et al., Roller Interface for Mobile Device Applications, (2007), pp. 7-13, Proceedings of AUIC '07 (Australian User Interface Conference), Australia.

Chang S. H.H. et al., (Origami Simulator: a Multi-Touch Experience, (2009), pp. 3889-3894, CHI '09, Boston, Massachusetts.

\* cited by examiner

METHOD, SYSTEM AND COMPUTER READABLE MEDIUM FOR DOCUMENT VISUALIZATION WITH INTERACTIVE FOLDING GESTURE TECHNIQUE ON A MULTI-TOUCH DISPLAY

BACKGROUND

1. Field

The present disclosure relates to interactive document visualization, and specifically, a method, system, and computer readable medium for document visualization using interactive folding gesture techniques on a multi-touch display.

2. Description of the Related Art

Interactive document visualization is used in displaying images, such as three dimensional (3D) images, on a display. There currently exist multi-touch displays which are now commonly used for visualization on a display. Further, different methods of displaying information on such displays currently exist.

An effective principle for visualizing information on a display is the focus-plus context principle. A method that uses the focus-plus-context principle displays content in a focus region which is rendered at high fidelity with minimal distortion, and displays content in a peripheral context region with a certain amount of distortion so as to make efficient use of screen space or computational resources. An example of a method that uses the focus-plus-context principle is the fisheye view. However, the fisheye view works poorly for displaying documents since the fisheye view transforms straight lines into curved lines which causes poor legibility.

Another form of the focus-plus context principle for visualizing documents is folding. The objects or pages of the document are rendered so that each part of the document is flat and parallel to the screen without distortion. The context regions are folded off to the sides with perspective distortion. In Mackinlay, *The Perspective Wall: Details and context smoothly integrated* (1991), three "walls" are used for displaying a document in 3D. A Perspective Wall style visualization is shown in document 101 of FIG. 1, in which a center wall faces the user and renders the document without distortion in a plane parallel to the screen. Two side walls of the document are rendered with the effects of perspective distortion. Perspective distortion causes the contents that are farther into the screen to be rendered smaller, as shown in FIG. 1. As shown in FIG. 1, straight line segments (e.g. in the text characters) are rendered to straight line segments on the side walls in FIG. 1.

Elmqvist, Melange: *Space folding for multi-focus interaction* (2008), is another example of an information visualization method using the focus-plus context principle with folding. A 3D space folding metaphor is used and multiple focus regions of the space are rendered facing the user without distortion and the context regions are rendered with perspective distortion. Specifically, Elmqvist uses a 3D space folding metaphor with multiple focus regions parallel to the screen and the rest of the space is folded up.

Mackinlay exemplifies document visualization using folding techniques. However, they do not provide users with an adequate display and folding of a desired document.

Further, in the field of document visualization on a display, there currently exist different ways of manipulating a document. As shown in FIG. 2, documents can be displayed on a display 201 overlapping each other. However, portions of the document appearing on the face of the document are not visible to the user in the overlapping portions.

Another type of document visualization is origami folding. However, origami has different goals than folding for document visualization.

Therefore, there exist deficiencies in the current art with respect to folding visualizations. In Mackinlay and Elmqvist, for example, a standard mouse and keyboard setup is used. This does not exemplify how a physical piece of paper would be physically folded by a person, which is usually done with more than one finger and with two hands. Therefore, the current art does not properly provide interaction techniques that allow a user to fold documents on a display.

SUMMARY

An exemplary embodiment provides a method, system and computer readable medium thereof for folding a document page object. An exemplary embodiment provides method for folding a document page object in a graphical user interface using multi-touch gestures including establishing at least two contact points on a display; moving at least one of the two contact points to create a fold on the document page object; and displaying the folded document page object.

Further, the multi-touch gestures control the folding of the document page object according to a gesture model and a gesture mapping.

The gesture model includes at least one of a Symmetric-Parallel (SP) gesture model and an Asymmetric-Serial (AS) gesture model.

Also, the at least two contact points are established by hands of a user; and the SP gesture model includes gestures which move the at least two contact points established by the hands of the user so that the hands have symmetric roles to each other and the moving of any of the at least two contact points are interpreted in a same way.

Further, the AS gesture model includes gestures which maintain a first contact point established by a non-dominant hand in a fixed position while moving a second contact point established by a dominant hand from a first position to a second position.

The gesture mapping includes at least one of a Logical gesture mapping, a Directional gesture mapping, and a Contact Point Constrained (CPC) gesture mapping.

In the Logical gesture mapping an amount of movement of a gesture perpendicular to a projection of an intersecting edge is mapped to a fold angle.

In the Directional gesture mapping a fold direction is based on a movement of the at least two contact points toward each other or away from each other.

In the CPC mapping, the at least two contact points correspond to points on two sections of a document and the sections underneath the at least two contact points follow a movement of a user's fingers.

Also, the fold is performed in a determined crease location.

In addition, the crease location is determined by at least one of heuristics, content analysis algorithms, and user interaction.

According to another exemplary embodiment, a method for performing document visualization using interactive multi-touch folding gestures includes determining a gesture model which specifies folding actions for a document page object according to user manipulation of a display; determining a gesture mapping which maps gesture path events for the visualization of the document page object; folding the document page object according to the determined gesture model and gesture mapping; and displaying the folded document page object.

In another exemplary embodiment, there is provided a system for folding a document page object in a graphical user interface using multi-touch gestures including a gesture model unit which determines a gesture model which specifies folding actions for a document page object according to user manipulation of a display; a gesture mapping unit which determines a gesture mapping which maps gesture path events for the visualization of the document page object.

The gesture model unit includes one of an Asymmetric-Serial (AS) gesture model unit and a Symmetric-Parallel (SP) gesture model unit.

Further, the at least two contact points are established by hands of a user; and the SP gesture model unit determines movement of the at least two contact points established by the hands of the user so that the hands have symmetric roles to each other and interprets the moving of any of the at least two contact points in the same way.

The AS gesture model unit determines whether a first contact point is established by a non-dominant hand which in a fixed position while determining movement of a second contact point established by a dominant hand from a first position to a second position.

The gesture mapping unit includes one of a Logical gesture mapping unit, a Directional gesture mapping unit, and a CPC gesture mapping unit.

The Logical gesture mapping unit determines an amount of movement of a gesture perpendicular to a projection of an intersecting edge which is mapped to a fold angle.

The Directional gesture mapping unit determines a fold direction based on a movement of the at least two contact points toward each other or away from each other.

The CPC gesture mapping unit determines whether at least two contact points correspond to points on two sections of a document and whether the sections underneath the at least two contact points follow a movement of a user's fingers.

Another exemplary embodiment provides a computer program product for folding a document page object in a graphical user interface using multi-touch gestures, the computer program product embodied on a computer readable medium and when executed by a computer, performs a method including: establishing at least two contact points on a display; moving at least one of the two contact points to create a fold on the document page object; and displaying the folded document page object.

BRIEF DESCRIPTION OF DRAWINGS

Certain aspects of the present invention will become more apparent by describing in detail illustrative, non-limiting embodiments thereof with reference to the accompanying drawings, in which like reference numerals refer to like elements in the drawings, in which.

DETAILED DESCRIPTION

Figure 1:
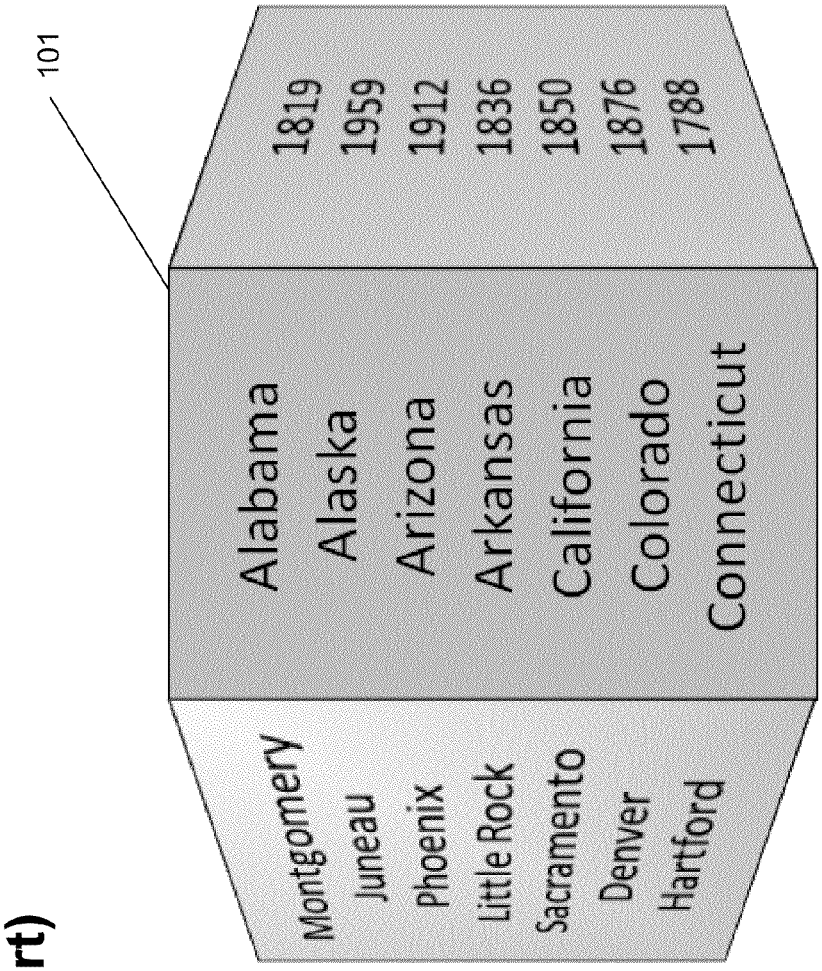
FIG. 1 illustrates a focus-plus-context technique in a Related Art.
Figure 2:
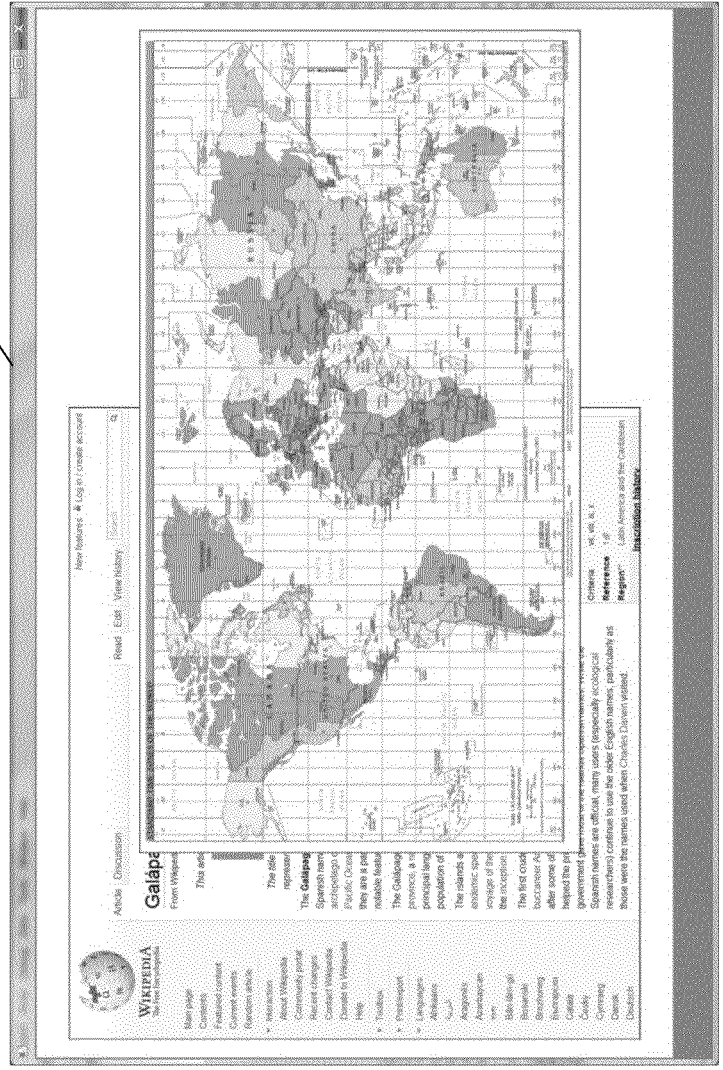
FIG. 2 illustrates overlapping document display in a Related Art.

Various embodiments are described in detail with reference to the accompanying drawings. The embodiments may be embodied in various forms without being limited to the embodiments set forth herein. Descriptions of well known parts are omitted for clarity, and like reference numerals refer to like elements throughout.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
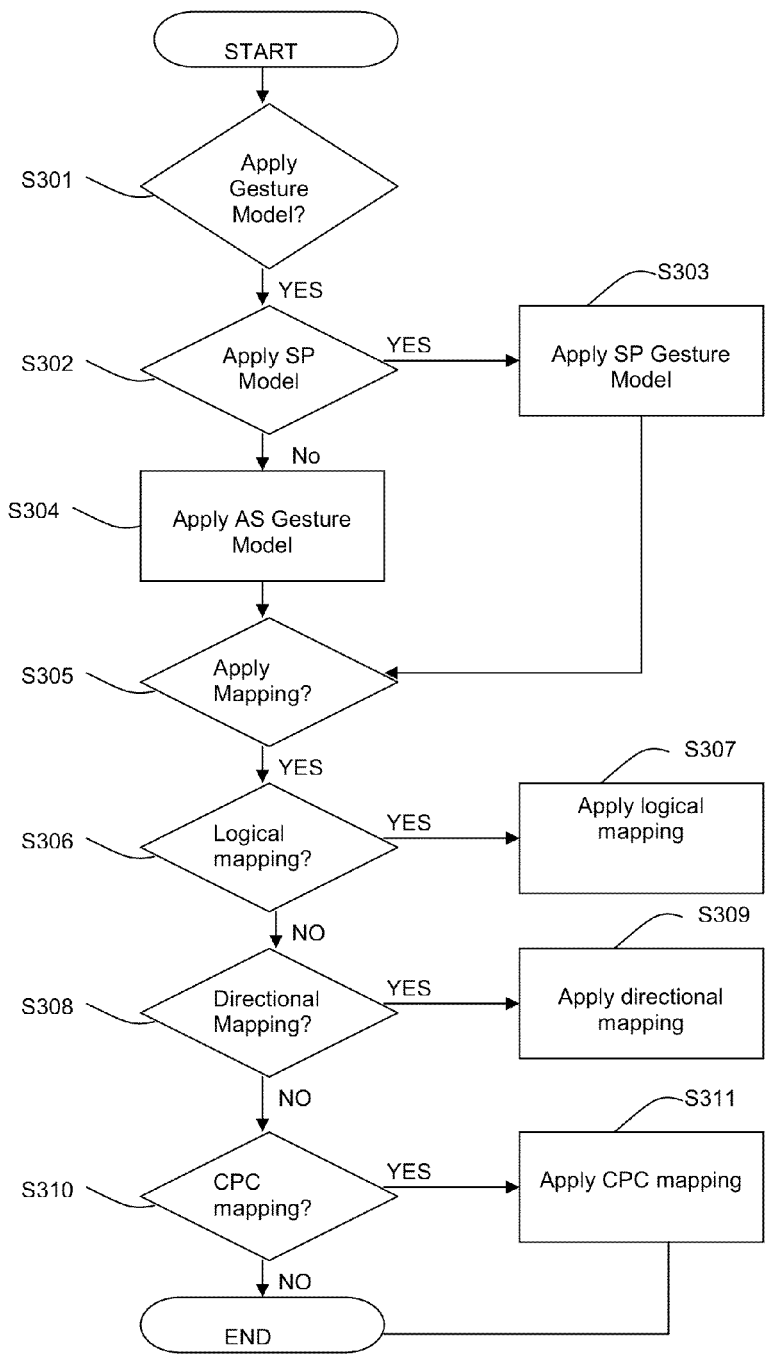
FIG. 3 is a flowchart illustrating an exemplary method of visualizing a document on a display using interactive folding gesture techniques.
Figure 4:
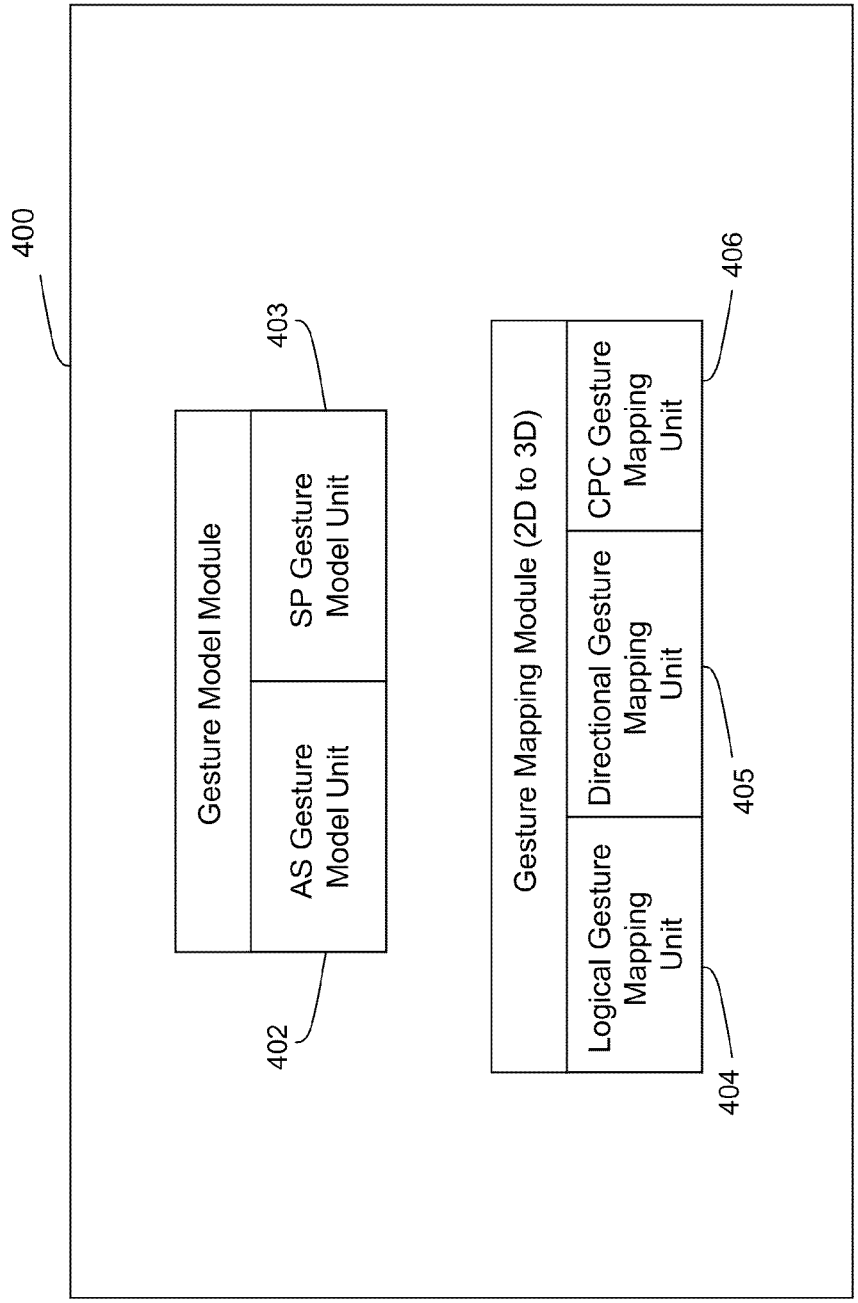
FIG. 4 is a block diagram illustrating a system for implementing the method of visualizing a document on a display using interactive folding gesture techniques.

FIG. 3 is a flowchart illustrating an exemplary method of visualizing a document on a display using interactive folding gesture techniques. In an exemplary embodiment, multi-touch screens are employed which support a more natural and direct interaction by allowing fingers from both of a user's hands to be used together. FIG. 4 is a block diagram illustrating a system for implementing the method of visualizing a document on a display using interactive folding gesture techniques.

In a document visualization system, there is a 3D application with a graphical user interface. The document page objects are inside the document visualization system. A document page object is a 2D graphical object that represents a page. A document page object can also represent a stack of pages, and more generally it can represent an application window (e.g. a Web browser, a word processor, etc.). A document page object can also have some content on it, or it can also be blank Further, a document page object can be, for example, of a rectangular shape, but is not limited to this shape and can be any shape. Further, although folding is described, the operations for document visualization can also include unfolding documents.

Referring to FIGS. 3 and 4, at step 301, it is determined whether a gesture model for performing folding should be applied. The gesture models are based on the combinations of the characteristics {Symmetric, Asymmetric} and {Serial, Parallel}. The characteristic {Symmetric, Asymmetric} refers to the roles of the hands; i.e., whether the input contact points of the fingers from each of the two hands are treated symmetrically or asymmetrically with respect to the hands. For the asymmetric case, the user's dominant and non-dominant hands would be assigned different roles so that the movements requiring more dexterity would be performed by the dominant hand. The {Serial, Parallel} refers to whether the input contact points are constrained to move one at a time, or are allowed to move simultaneously.

The combinations are: Symmetric-Serial (SS), Symmetric-Parallel (SP), Asymmetric-Serial (AS), Asymmetric-Parallel (AP). The Symmetric-Serial (SS) model may not be practical because there is no reason to limit the user from moving both hands simultaneously since they function independently. The Asymmetric-Parallel (AP) gesture model does not exist in practice because as disclosed in an exemplary embodiment, asymmetric is based on the non-dominant hand staying still while the dominant hand is moving. Hence, the exemplary embodiments are directed to the Symmetric-Parallel (SP) gesture model and Asymmetric-Serial (AS) gesture model. As disclosed in an exemplary embodiment, a gesture model specifies how the movements of the user's hands and fingers on the multi-touch display correspond to different folding actions.

If it is determined at step 301 that a gesture model should be applied, the system 400 as illustrated in FIG. 4 will apply a gesture model.

At step 302, it is determined by the system's configuration settings whether to apply the SP gesture model. In the SP model, a user employs a finger from each hand to touch and select two adjacent sections of, for example, a document page image object. Both of the user's hands move simultaneously and both fingers' touch events are interpreted the same way. A touch event is a point along with a time stamp, usually sampled every few milliseconds, and a gesture is determined by a sequence of touch events. For a multi-touch gesture, there are multiple sequences of touch events, one for each contact point.

If the system's configuration settings specify the application of the Symmetric-Parallel (SP) gesture model, at step 303, the SP gesture model is applied by the SP gesture model unit 403. Implementations of the SP gesture model will be explained in more detail with reference to FIGS. 6A, 6B, 7A, 7B and 8.

If at step 302 the system's configuration settings does not specify the application of the SP gesture model, then the Asymmetric-Serial (AS) model can be applied at step 304 using the AS gesture model unit 402. With the AS gesture model, one hand is held fixed while the other hand moves. Implementations of the AS model will be explained in more detail with reference to FIGS. 9A, 9B, 10A, 10B, and 11. At step 305, it is determined by the system's configuration settings whether a particular gesture mapping should be applied to the selected gesture model. A gesture mapping is used to map gesture path events in 2D space on the display into 3D space for the visualization. Gesture mappings can include a Logical gesture mapping, a Directional gesture mapping and a Contact point constrained (CPC) gesture mapping.

In a Logical gesture mapping, the amount of gesture movement perpendicular to the projection of the crease onto the screen is mapped to the fold angle. The fold direction is governed by a convention such as the right hand rule from vector geometry. In a CPC gesture mapping, the contact point of the finger on the screen corresponds to a point on a section via the projection of the section in 3D space onto the 2D screen, and this point on the section follows the movement of the finger so that it is always under the contact point. In a Directional gesture mapping, the fold direction is based on whether the two fingers of a user are moving toward each other or moving apart. The fold angle is based on the amount of movement.

If at step 306, the system's configuration settings specify the application of a Logical gesture mapping, then at step 307, a Logical gesture mapping is implemented by the Logical gesture mapping unit 404. If at step 308, the system's configuration settings specify to implement a Directional gesture mapping, then at step 309 a Directional gesture mapping is implemented by the Directional gesture mapping unit 405. If at step 310, the system's configuration settings specify to implement a CPC gesture mapping, then at step 311, a CPC gesture mapping is applied by the CPC gesture mapping unit 406.

The implementations of the different gesture mappings will be explained in more detail with reference to FIGS. 15A, 15B, 16A, 16B, 17A, 17B and 17C. Further, although the three gesture mappings are discussed above, the invention is not limited to these gesture mappings and other mappings can be used to interact with a document visualization.

Although the method as illustrated in FIGS. 3 and 4 is described with respect to a system's configuration settings specifying the gesture model and gesture mapping, the invention is not limited thereto and any form of selecting and specifying the gesture model and mapping can be applied. According to the device used by the user, the user can change the system's configuration settings (e.g. via a menu or dialog box) to select a specific multi-touch gesture model, or a multi-touch gesture model can be pre-specified within the device. For example, upon manufacture of the device, the multi-touch gesture model to be implemented by the device can be specified.

Figure 5:
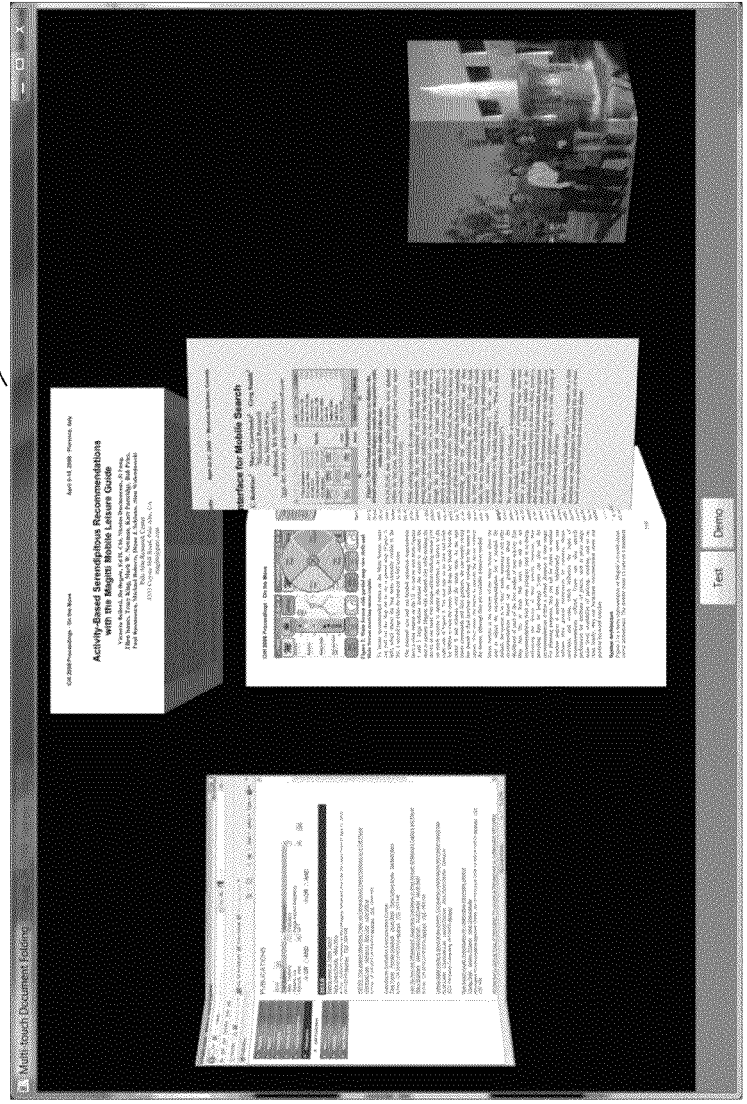
FIG. 5 illustrates the display of documents according to an exemplary embodiment.

Therefore, by implementing a gesture model and a gesture mapping, a user is capable of visualizing documents on, for example, a display 501 with folded sections as shown in FIG. 5. Specifically, as shown in FIG. 5 a single document or multiple documents can be displayed and manipulated by a user through folding gestures using the method as described in FIG. 3 and the system as described with respect to FIG. 4. Although portions of a document are folded, all of the text is visible to a user consequently saving space on a graphical user interface. The user can fold the sections so that the desired text is facing the user without distortion, and the less important text is bent back with some perspective distortion but still legible to some degree. This allows a user to have multiple documents open, while still allowing a user to see the content of the documents.

Further, the manipulation of the document involves multi-touch gestures in which a plurality of fingers, for example, contact a display to manipulate a document on the display. One finger can be used to touch and hold a section of a document, while another finger touches and drags another section of the document to manipulate the document. Further, although the use of fingers for touching the display is discussed, the exemplary embodiments are not limited to the use of fingers, and other methods of creating contact points on a display can be used. For example, multiple styluses can be employed instead of fingers.

Also, a document can include a representation of a piece of paper on a display, but is not limited to the display of a piece of paper but can include any image or document that can be displayed on a display such as a web page or photograph. Furthermore, the representation can be of an application window object such as a word processing application window or a Web browser window. Also, the document can be a blank document or can contain text and images.

The folding of such documents could be extended not merely to single documents on a display, but to multiple documents on a display. This would assist in window management of a graphical user interface. Therefore, as opposed to, for example, overlapping windows so as to create space on a graphical user interface, the documents can be folded to utilize screen space.

As discussed above, the document visualization can be implemented to mimic a physical folding of a piece of paper or a document.

Figure 6:
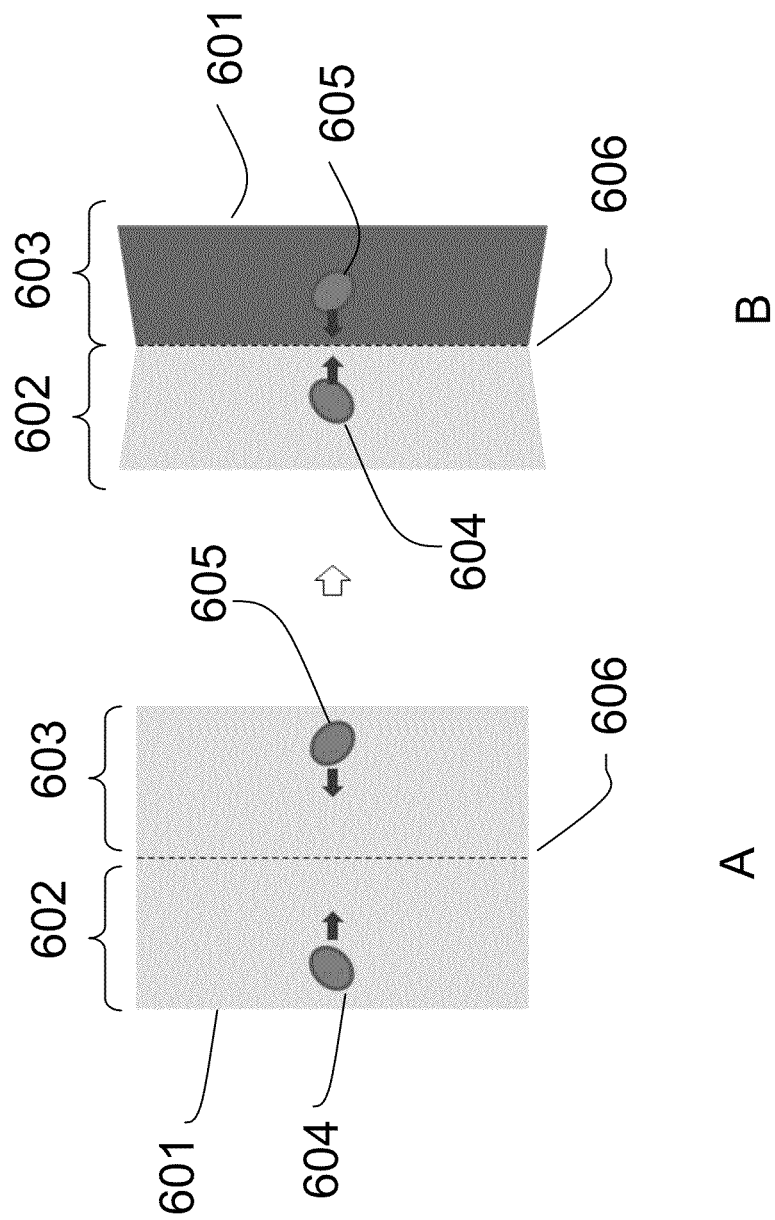
FIGS. 6A and 6B illustrate an implementation of the Symmetric-Parallel gesture model for performing a valley fold.
Figure 7:
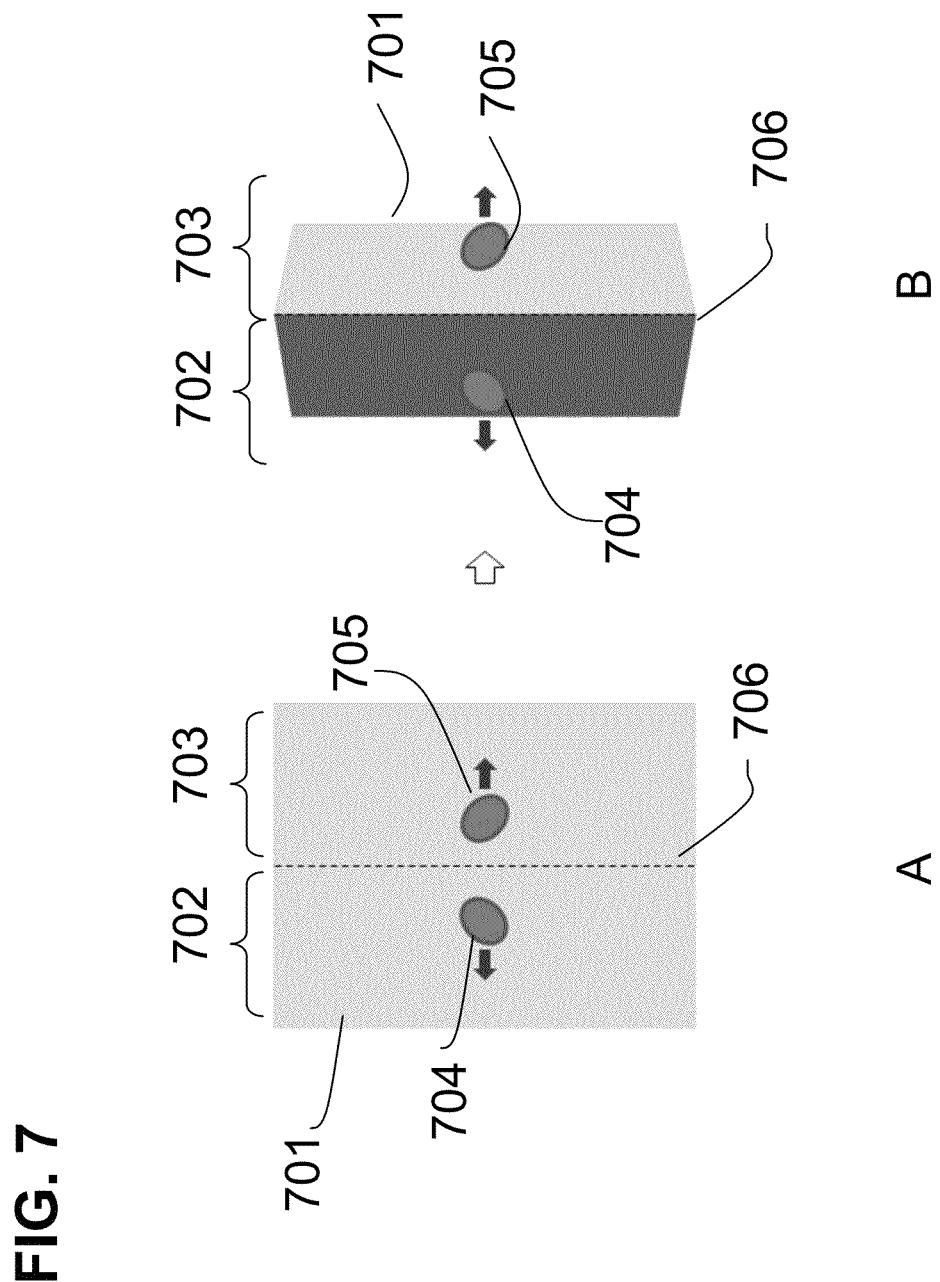
FIGS. 7A and 7B illustrate an implementation of the Symmetric-Parallel gesture model for performing a mountain fold.
Figure 8:
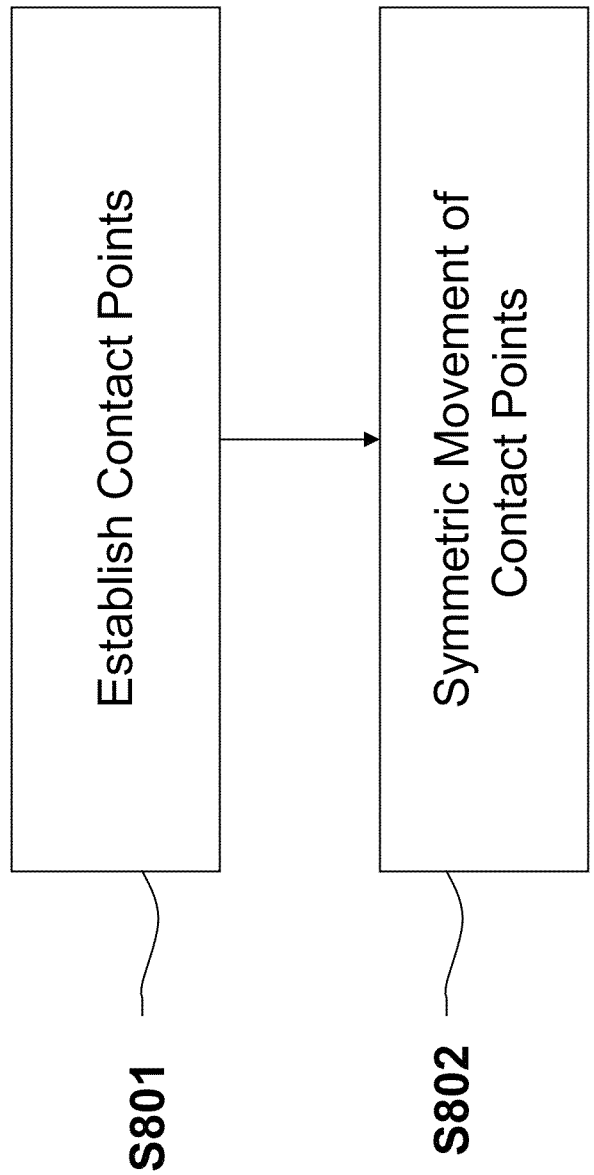
FIG. 8 is a flowchart illustrating a method for implementing a Symmetric-Parallel gesture model.

FIGS. 6A and 6B illustrate an implementation of the Symmetric-Parallel (SP) gesture model for performing a valley fold. FIGS. 7A and 7B illustrate an implementation of the SP gesture model for performing a mountain fold. FIG. 8 is a flowchart illustrating a method for implementing a SP gesture model.

As shown in FIGS. 6A and 6B, a document 601 can be divided into two sections, sections 602 and 603. The determination of sections within a document is explained in more detail with reference to FIGS. 18 and 19. Although two sections on a document are illustrated, the invention is not limited to two sections, and two sections are described for ease of explanation.

As further shown in FIGS. 6A and 6B, a contact point 604 is established in section 602 of the document and a contact point 605 is established in section 603 of the document. More generally, a contact point is not limited to being inside a selected section, since the nearest section to the contact point can be assigned as the selected section. A contact point is a point where a finger touches the screen. Contact points can be established by a display that can detect when users are touching it with one or multiple fingers.

In the SP model, a user employs a finger from each hand to touch and select two sections of the document page object and both hands move simultaneously. Both fingers touch events are interpreted the same way. The user then moves the finger from each hand, which are at contact points 604 and 605, to fold the section about the intersecting edge of the two sections. For example, the intersecting edge can be a crease 606. The determination of crease locations is discussed in more detail with reference to FIGS. 18 and 19. As illustrated in FIGS. 6A and 6B, when the contact points 604 and 605 are moved toward each other by a symmetrical parallel movement of the user's fingers, a valley fold is created in document 601.

As shown in FIGS. 7A and 7B, document 701 includes sections 702 and 703. When the contact points 704 and 705 are moved away from each other by a symmetrical parallel movement of the user's fingers, a mountain fold is created in document 701 at crease 706.

Therefore, as shown in FIG. 8, at step 801, when performing folding using the SP gesture model, contact points are established on the document page object. Then at step 802, a symmetric parallel movement of a user's fingers is employed to create a fold in a document.

To ensure that the finger movements in the SP model are correctly interpreted by the user's device and are not confused with other gestures, mechanisms can be implemented to distinguish the symmetric movement of fingers from other gestures. For example, a known standard multi-touch gesture operation for the manipulation of a document includes the Pinch gesture. To prevent confusion of commands, mechanisms can be provided to the user to ensure that the appropriate operations are performed. For example, the device can be programmed to only perform commands according to the SP model, or a user can indicate that commands according to the SP model are desired.

Figure 9:
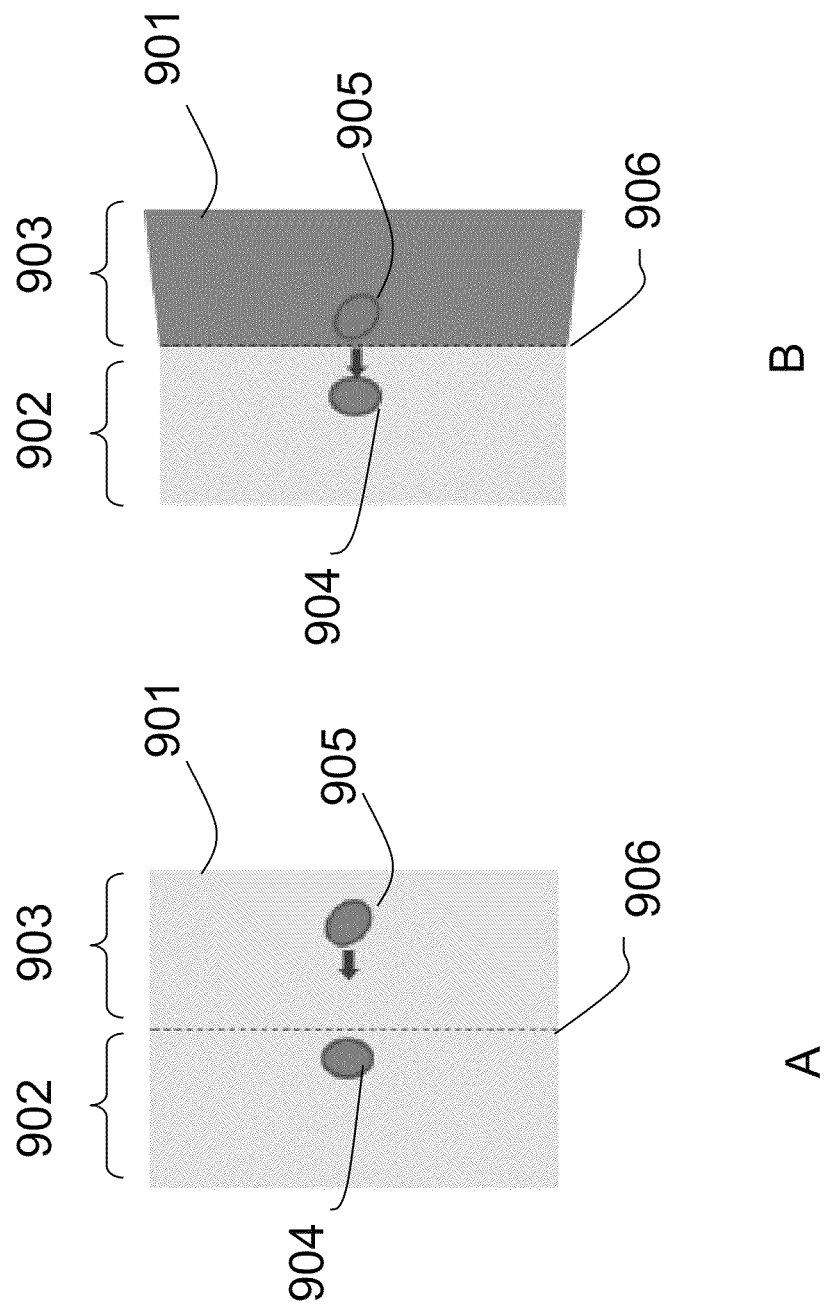
FIGS. 9A and 9B illustrate an implementation of the Asymmetric-Parallel gesture model for performing a valley fold.
Figure 10:
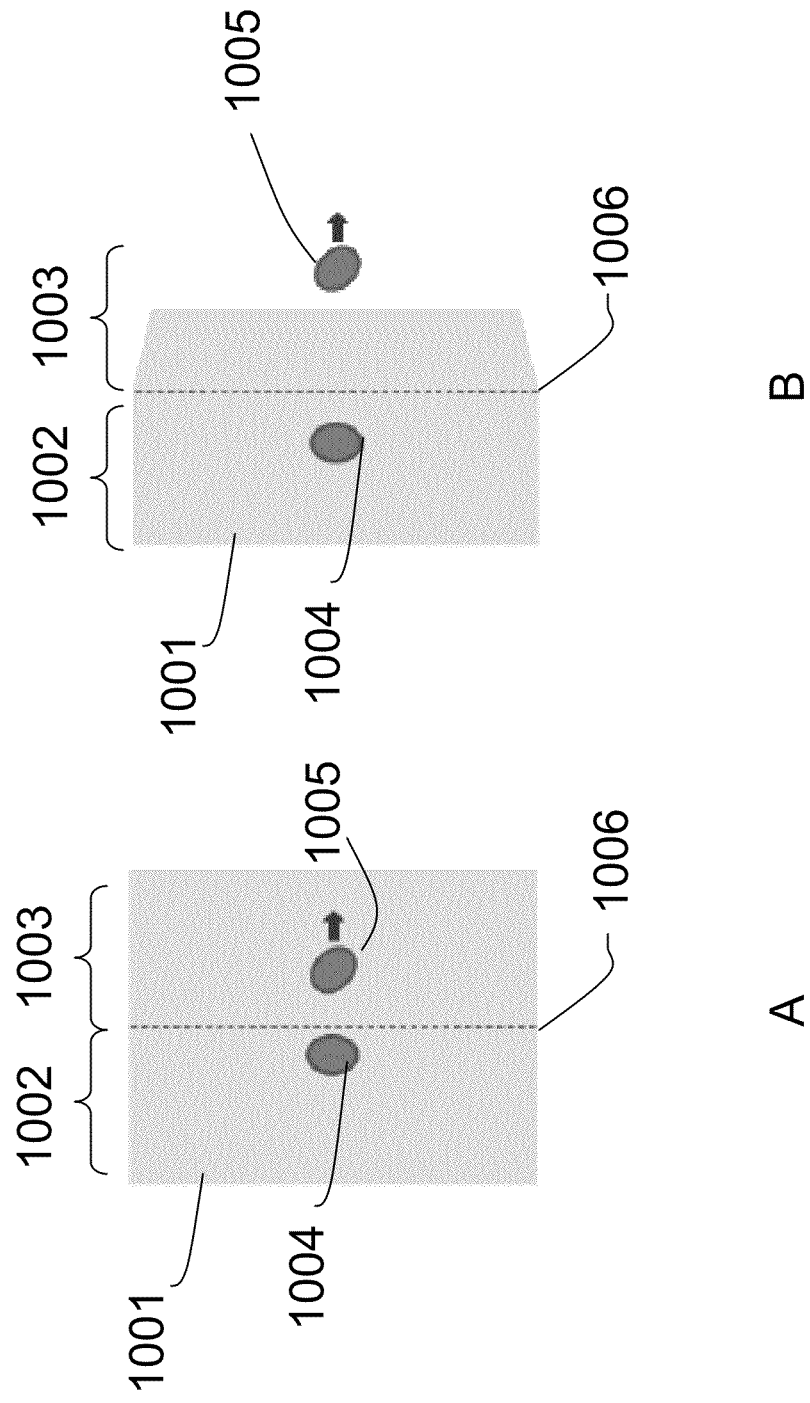
FIGS. 10A and 10B illustrate an implementation of the Asymmetric-Parallel gesture model for performing a mountain fold.
Figure 11:
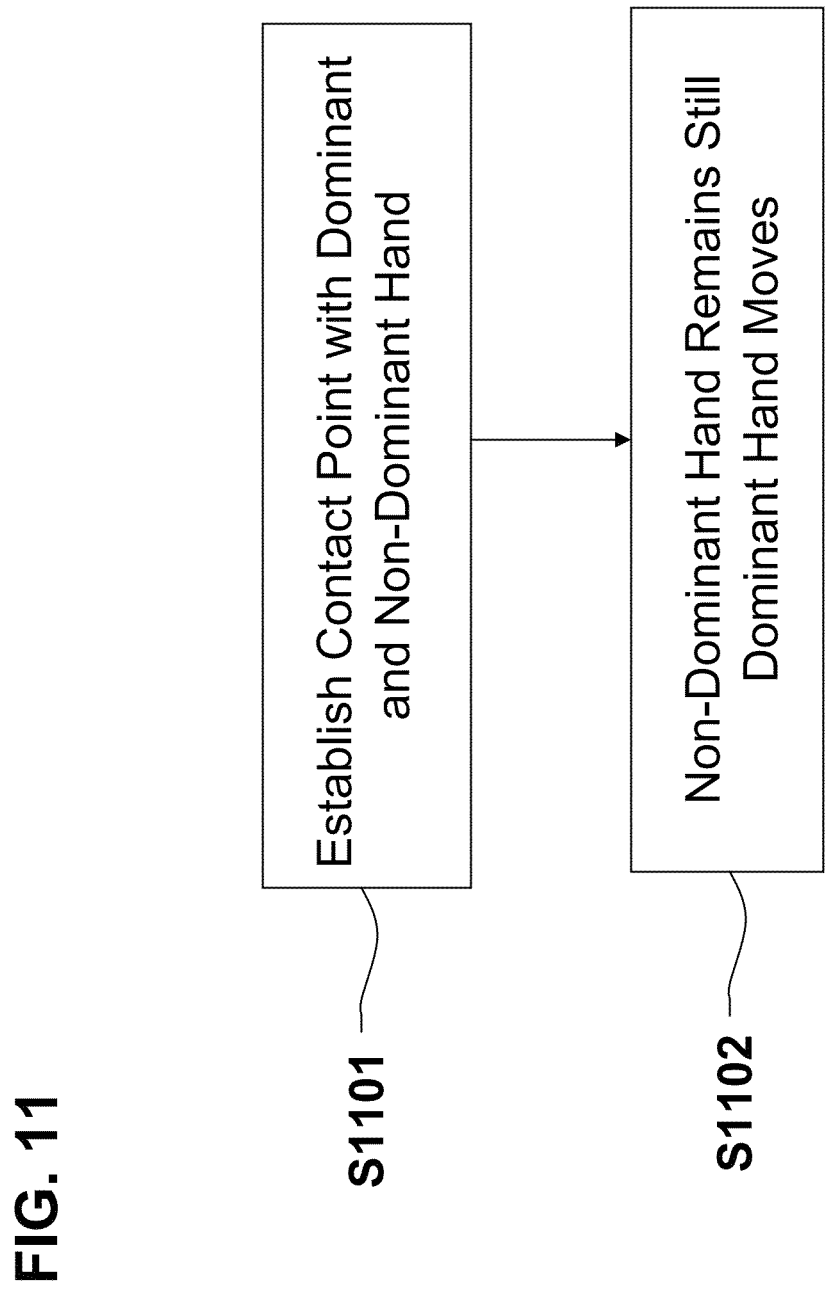
FIG. 11 is a flowchart illustrating a method for implementing an Asymmetric-Parallel gesture model.

FIGS. 9A and 9B illustrate an implementation of the Asymmetric-Serial (AS) gesture model for performing a valley fold. FIGS. 10A and 10B illustrate an implementation of the AS gesture model for performing a mountain fold. FIG. 11 is a flowchart illustrating a method for implementing an AS gesture model.

As shown in FIGS. 9A and 9B, a document 901 can be divided into two sections, sections 902 and 903. The determination of sections within a document is explained in more detail with reference to FIGS. 18 and 19. As further shown in FIGS. 9A and 9B, a contact point 904 is established in section 902 of the document and a contact point 905 is established in section 903 of the document.

The AS model mimics user interaction with physical objects. For example, when cutting an object with a knife, the non-dominant hand holds the object in place while the dominant hand performs the cutting. If a person is right handed, his or her dominant hand is the right hand and the non-dominant hand is the left hand. When folding a document using the AS model, a finger from the non-dominant hand touches and selects a section or a crease of a document, and holds the finger in a fixed position followed by the use of a second finger from the dominant hand which touches and selects a target section and moves the dominant hand to perform a folding action.

As illustrated in FIG. 9A, a contact point 904 in section 902 can be established with a finger of a user's non-dominant hand and a contact point 905 in section 903 is established with a finger of a user's dominant hand. The finger at contact point 904 remains still while the finger at contact point 905 moves toward contact point 904.

As illustrated in FIG. 9B, after the movement of contact point 905 toward contact point 904, a valley fold is created about the intersecting edge of the two sections 902 and 903. The intersecting edge can be a crease 906. The determination of crease locations is discussed in more detail with reference to FIGS. 18 and 19.

As illustrated in FIG. 10A, a contact point 1004 is established with a finger of a user's non-dominant hand and a contact point 1005 is established with a finger of a user's dominant hand in document 1001. The finger at contact point 1004 in section 1002 remains fixed while the finger at contact point 1005 in section 1003 moves away from contact point 1004. As illustrated in FIG. 10B, after the movement of contact point 1005 away from contact point 1004, a mountain fold is created at crease 1006.

Therefore, as shown in FIG. 11, at step 1101, when performing folding using the AS gesture model, contact points are established on the document. Then at step 1102, a contact point established by the user's non-dominant hand remains fixed while a contact point established by a user's dominant hand moves to create a fold.

A mountain fold and valley fold are illustrated above, however, the invention is not limited to the mountain fold and valley fold and various types of folding operations can be performed to create the desired visualized document. For example, other types of folds include a horizontal fold, a diagonal fold, an accordion fold and a series of folds as shown in FIGS. 12A, 12B, 13A, 13B and 14.

Figure 12:
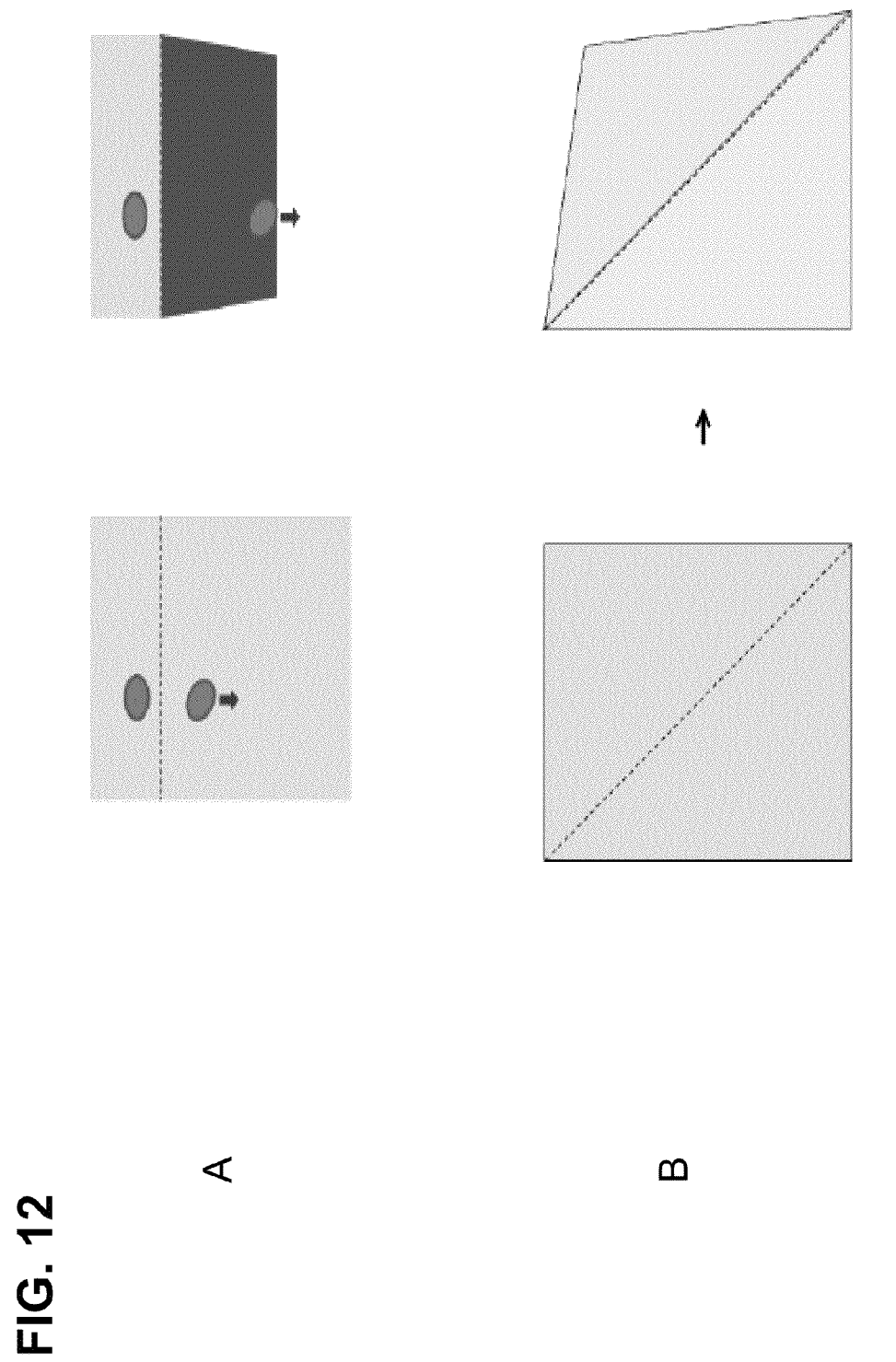
FIGS. 12A and 12B illustrate a horizontal fold and a diagonal fold, respectively, according to an exemplary embodiment.
Figure 13:
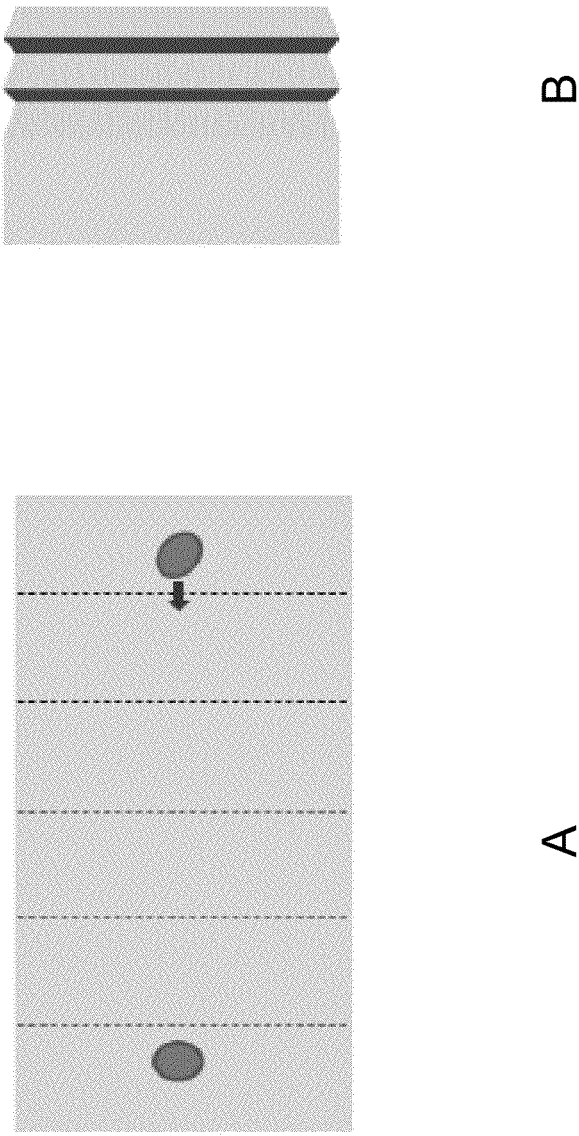
FIGS. 13A and 13B illustrate an accordion fold according to an exemplary embodiment.

FIGS. 12A and 12B illustrate a horizontal fold and a diagonal fold, respectively, according to an exemplary embodiment. As shown in FIG. 12A, a horizontal fold involves folding a document along a horizontal axis of the document. A diagonal fold involves folding a document a long a diagonal as shown in FIG. 12B.

FIGS. 13A and 13B illustrate an accordion fold according to an exemplary embodiment. An accordion fold is activated when there is at least one section between two sections touched by a user's fingers. With an accordion fold, a document can be divided in several sections.

An accordion fold is activated when there is at least one section between two sections of a document. A contact point is established in one section and another contact point is established in another section. When implementing the accordion fold in the SP gesture model, both contact points can be symmetrically and in parallel moved toward or away from each other to create an accordion fold. To ensure that the accordion fold is not confused with another fold, mechanisms can be implemented to indicate that an accordion fold is desired.

When performing an accordion fold in the AS gesture model, as opposed to the SP gesture model, a contact point established by the non-dominant hand remains fixed while a contact point established by the dominant hand moves towards or away from contact point established by the non-dominant hand.

Figure 14:
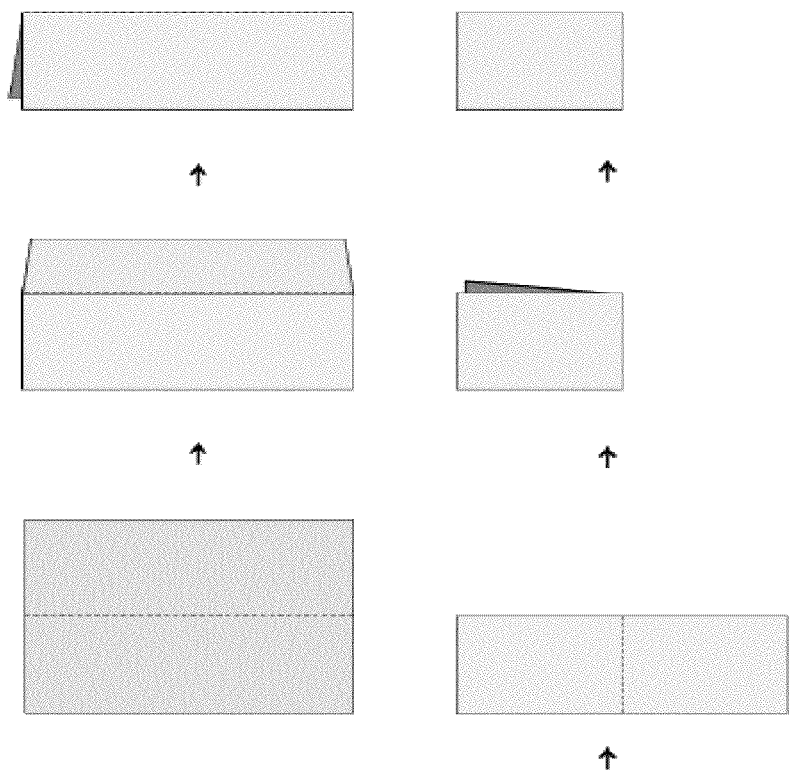
FIG. 14 illustrates a sequence of folds according to an exemplary embodiment.

FIG. 14 illustrates a sequence of folds according to an exemplary embodiment. As shown in FIG. 14, a sequence of folds involves a series of folds. These can be sequences of folds about horizontal and vertical creases of a document.

Further, although two touch points have been illustrated, the invention is not limited to two touch points, and more than two touch points can be used to fold a document. For example, if using three touch points, three touch point commands could indicate a more complex fold while two touch points would indicate a simple fold. Also, by using more than two contact points, separate gestures for different functions can be designed. For example, when performing an accordion fold, two fingers on the dominant hand instead of one finger as discussed above with respect to FIG. 13, can be used to select and move a section. As another example, a user can specify a crease in any orientation by placing two fingers of the non-dominant hand on the desired crease location as the two contact points determine a line. The determination of a crease location is explained in more detail below.

Figure 15:
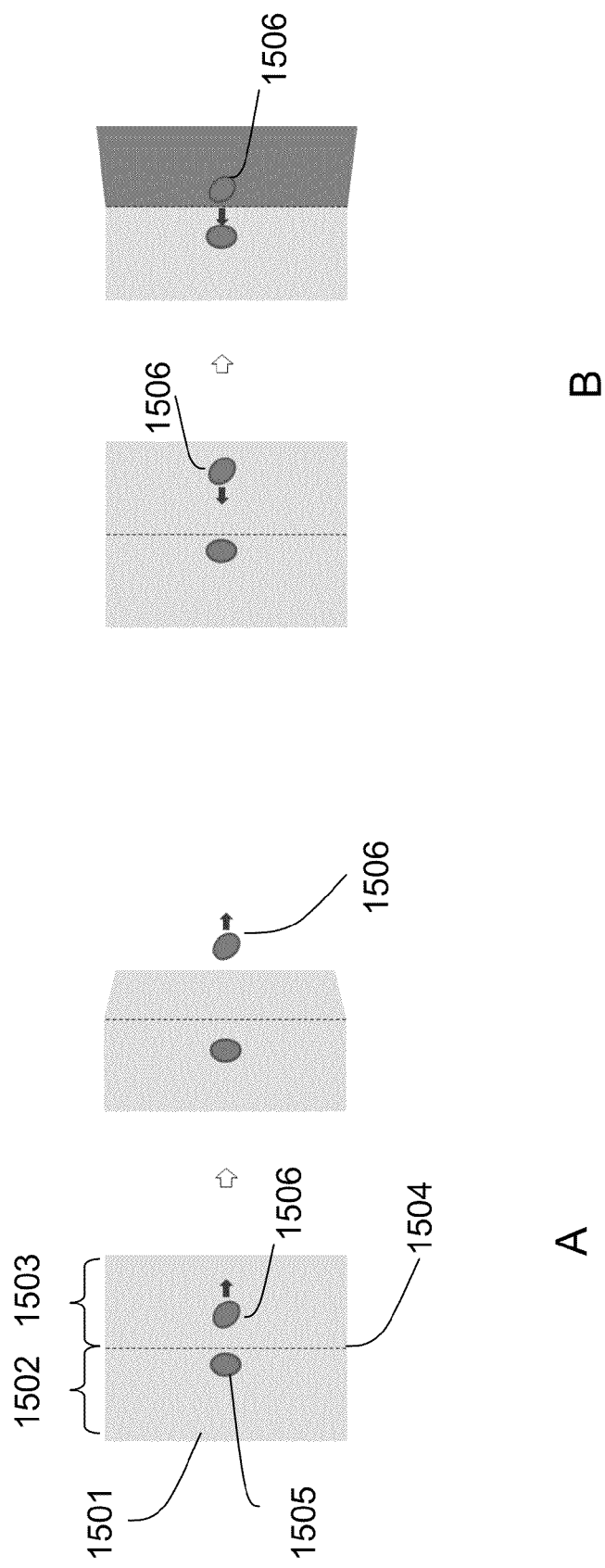
FIGS. 15A and 15B illustrate an implementation of the Logical gesture mapping.
Figure 16:
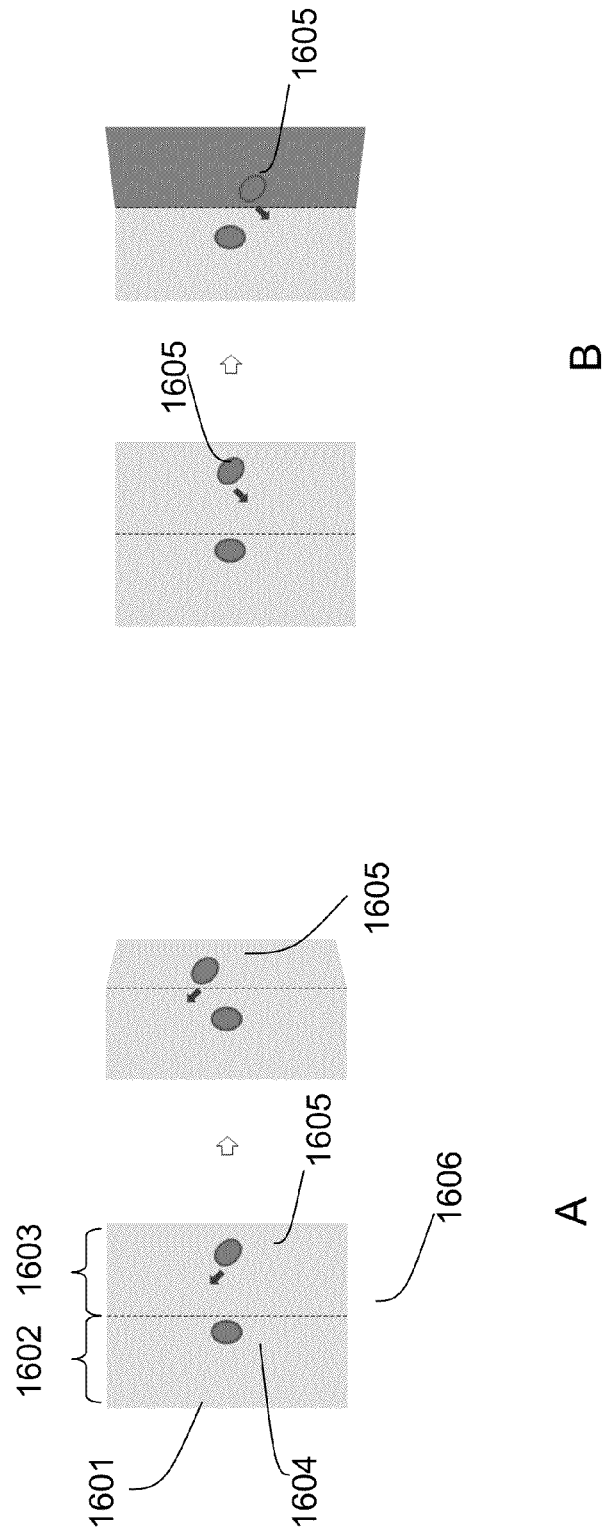
FIGS. 16A and 16B illustrate an implementation of the Directional gesture mapping.
Figure 17:
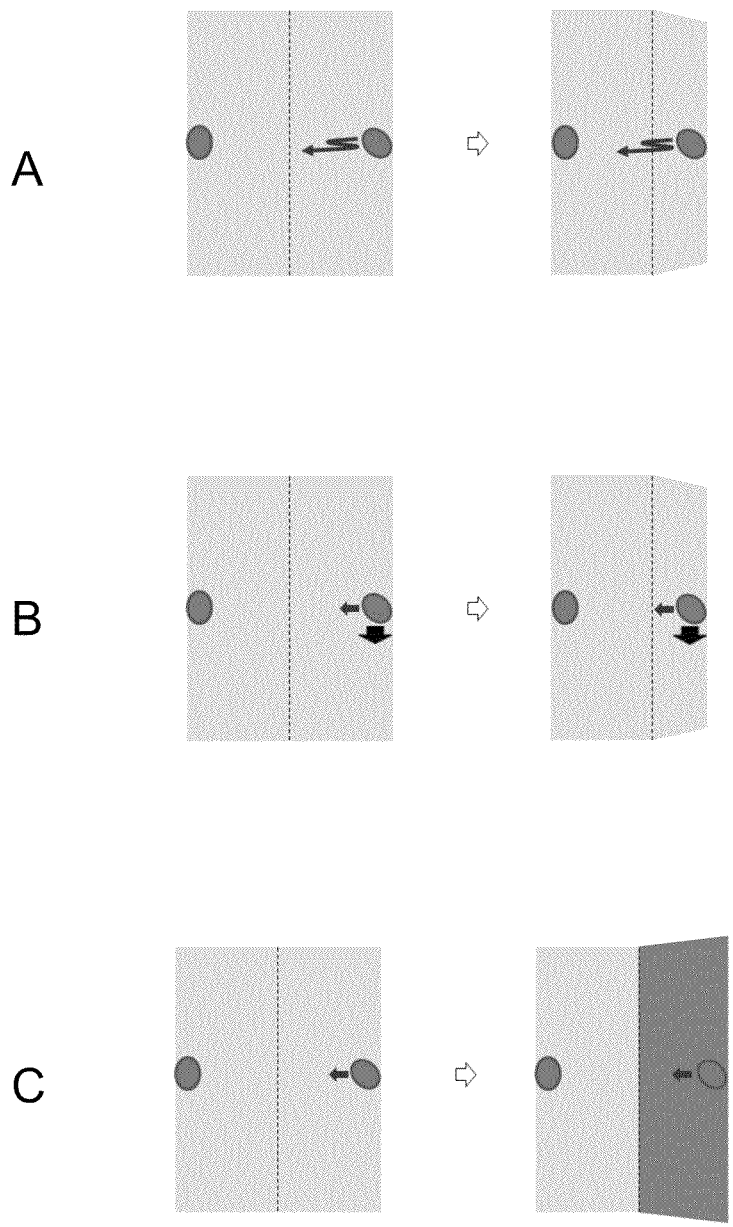
FIGS. 17A, 17B, and 17C illustrate an implementation of the Contact-Point-Constrained (CPC) gesture mapping.

FIGS. 15A and 15B illustrate an implementation of the Logical gesture mapping. FIGS. 16A and 16B illustrates an implementation of the Directional gesture mapping. FIGS. 17A and 17B illustrate an implementation of the Contact-Point-Constrained (CPC) gesture mapping.

A gesture mapping maps gestures to folding actions. A gesture mapping is used to map gesture path events in 2D space on the display into 3D space for the visualization. The direction of the folding and the amount of folding performed in the gesture models can be determined according to moving gesture paths. Specifically, the gestures models, such as the SP model and the AS model, can be interpreted into folding actions through several mappings such as the Logical gesture mapping, the Directional gesture mapping and the CPC gesture mapping.

In the Logical mapping gesture, the amount of gesture movement perpendicular to the projection of the intersecting edge onto the screen is mapped to the fold angle. The fold direction (e.g. mountain or valley) is governed by a convention such as the "right hand rule" from vector geometry.

As shown in FIG. 15A, a document 1501 includes a crease 1504, sections 1502 and 1503 and contact points 1505 and 1506. The crease 1504 defines a fold axis vector that points upward toward, for example, the top of the display. Dragging the contact point 1506 to the right causes the section 1503 to rotate into the screen by the right hand rule. Further, as shown in FIG. 15B dragging the contact point 1506 to the left causes the section 1503 to rotate toward the screen.

FIGS. 16A and 16B illustrate a Directional gesture mapping. The Directional gesture mapping is based on the movements of a user's fingers, for example, toward each other or apart from each other. A fold angle, or the rotation angle about the crease, of a document is based on the amount of movement of the gesture. The fold direction is based on whether the two fingers are moving toward each other or moving apart.

In the implementation of the Directional gesture mapping, gesture paths can be moved at an angle. For example, a gesture path can be angled upward for a mountain fold, and angled downward for a mountain fold. For a multi-touch gesture, either one or multiple gesture paths can be angled.

As illustrated in FIG. 16A, a document 1601 includes a crease 1606, contact points 1604 and 1605, and sections 1602 and 1603. When the contact point 1605 is moved at an angle towards the upper left of the document, a mountain fold is performed. As shown in FIG. 16B, when the contact point 1605 is moved at an angle towards the lower left of the document, a valley fold is created.

FIGS. 17A, 17B and 17C illustrate an implementation of the CPC gesture mapping. In the CPC gesture mapping, the point at which the finger makes contact with the screen or contact point, corresponds to a point on a section of a document via the projection of the section in the 3D space of the visualization onto the 2D space of the screen. This point on the section follows the movement of the finger so that this point on the section is always under the contact point or the point at which the finger makes contact with the screen. CPC mapping requires solving non-linear equations in real time in order to obtain the fold angle and fold direction.

For the user, the Directional and CPC gesture mapping may be more intuitive. With these two mappings, however, there is one problem that happens to occur at the most common configuration where the page object is completely flat and facing the user. If the user moves a finger in a straight line toward the other finger, the folding operation is not well-defined because there is an ambiguity: the section can be either a Mountain or Valley fold. Therefore, the gesture must encode more information to specify which way to fold. One solution for the Directional mapping is to angle the gesture upward for a Mountain fold and downward for a Valley fold.

The CPC mapping must also deal with the frequently occurring Mountain-Valley ambiguity problem described above. The above solution for the Directional mapping would not work because under the CPC mapping, the additional vector component is interpreted as a rotation about a horizontal axis parallel to the screen. More clever solutions are required. One approach is to use momentum by having the system initially pick an arbitrary direction, and if the fold does not go the intended way, the user quickly reverses the gesture direction and the momentum carries the section pass the point with the ambiguous state. FIG. 17A illustrates an implementation of a mountain fold using momentum. Another approach is to use pressure by sensing a hard press and mapping that to a mountain fold into the screen. As shown in FIG. 17B, a mountain fold is performed using pressure. FIG. 17C illustrates an implementation of CPC mapping for performing a valley fold in which a right contact point moves toward a left contact point without using pressure or momentum.

The Logical, Directional, and CPC gesture mappings are discussed above, however, the invention is not limited to these gesture mappings and any gesture mapping can be applied to interact with the document visualization.

Figure 18:
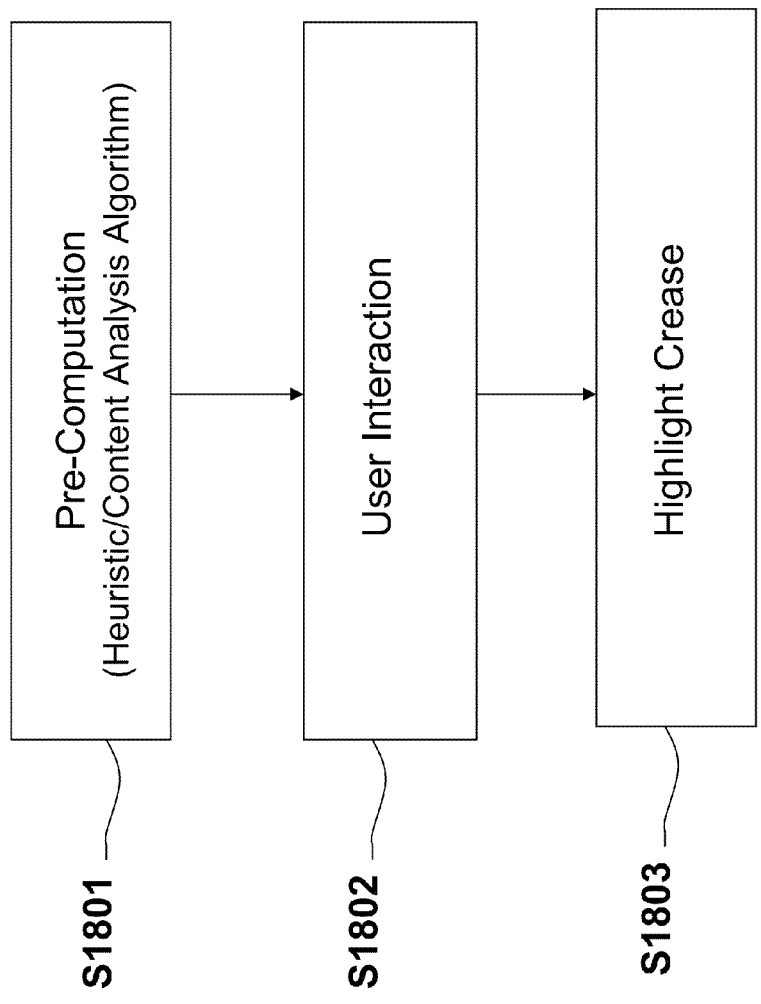
FIG. 18 illustrates a flowchart for a process of determining crease and fold locations on a document.

FIG. 18 illustrates a flowchart for a process of determining crease and fold locations on a document.

As discussed above, crease and fold locations can be provided on a document. Further, a document can be sectioned according to the needs of a user. The page sections and creases for folding a document can be determined by pre-computing sections using heuristics and content analysis algorithms, by user interaction, or by highlighting a crease.

In 3D visualization, each document page object appears as a single artifact. Each page object consists of a 3D model with an underlying triangular mesh geometry. The document page image is texture mapped onto the mesh geometry. Folding occurs at an edge where two sections meet. These edges are a subset of the edges of the mesh geometry.

The sections and the associated mesh geometry can be pre-computed based on, for example, the contents on the page, common types of folds, or can be determined in real-time by user interaction. The sections of a document can be pre-computed in advance of a folding operation performed by a user.

As mentioned above, the page sections and creases for folding a document can be determined by pre-computing sections using heuristics or by using content analysis algorithms.

If at step 1801, a user desires to perform 3D modeling based on pre-computing, the pre-computing can be performed based on heuristics or based on content analysis algorithms.

When performing the pre-computing heuristically, the sections on a document can be laid out and pre-computed based on how physical paper page would be folded by a person. For example, a piece of paper can be folded into halves, thirds, quarters, etc. The way in which a physical piece of paper could be folded can serve as a template for the mesh geometry for heuristic pre-computing. Also, templates can be created for folding documents on the display based on how a physical paper page would be folded by a person.

When performing the pre-computing of sections using content analysis algorithms, projection profiles can be used. Content analysis algorithms can be used in the construction of the mesh geometry and preserves the boundaries of visually coherent regions. Visually coherent regions are distinct areas of content in the layout; for example, in a two column page layout, each column is visually separated by a vertical gap of empty space. The boundaries in this case would be the perimeters of the columns, and the mesh geometry should have a line that runs through the empty space between the two columns so that it avoids (or minimizes) crossing the boundaries. The region boundaries can be computed based on the horizontal and vertical projection profiles of the pixels in the page image. Various page segmentation and layout analysis algorithms can also be applied and is not limited to computing region boundaries.

Figure 19:
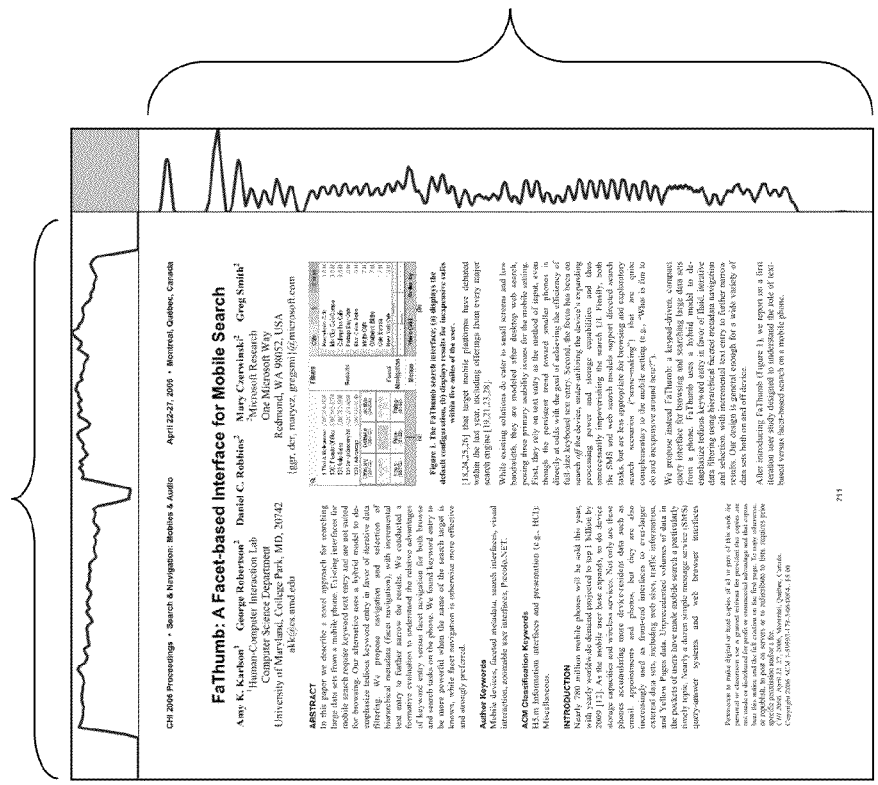
FIG. 19 illustrates projection profiles for a document according to an exemplary embodiment.

FIG. 19 illustrates projection profiles for a document according to an exemplary embodiment. When using projection profiles, pixel values in a horizontal or vertical direction is summed to determine horizontal or vertical boundaries of a region. Specifically, a projection profile is computed by summing the pixel values in the horizontal direction, horizontal projection profile 1901, to create a profile indicative of text line locations, and summing the pixel values in the vertical direction, vertical projection profile 1902, to create a profile indicative of columns. Although summing is disclosed in horizontal and vertical, the invention does not require summing in horizontal and vertical, and only horizontal or vertical need be performed.

Candidate crease locations are associated with the largest dips in the horizontal and vertical projection profiles. Dips are defined as a local minimum in the projection profile. In the document illustrated in FIG. 19, the areas containing text are black pixels and the areas which do not contain text are white pixels. Assuming, for example, the black pixels on the document illustrated in FIG. 19, have a value of '1' and white pixels have a value of '0', better crease locations have a smaller value in the projection profile since the white areas have a value of '0'. Although in the example, the black pixels are given a value of '1' and the white pixels are given a value of '0', the values of the pixels are not limited to these values. Any values which can be summed to determine white and black spaces can be used.

In FIG. 19, the profile value of dips corresponding to the space between paragraphs is smaller than the profile value of dips between lines within a paragraphs. If the lines of text in two columns do not line up, shallow dips are still present and correspond to locations where there is the most whitespace, or white, non-printed areas between words and lines. When the dip value is the same for adjacent values, one of the locations in the dip, such as the center, can be selected as the crease location.

A window can be used, such as an overlapping sliding window, to reduce the effects of varying amounts of black in characters. An overlapping sliding window is a window of, for example, twenty pixels where the window slides five pixels for each profile value. This allows finer sampling and more accurate crease placements. The profile would include information as to whether there are nearby lines. Specifically, to reduce the effects of varying amounts of black in characters, for example, the baseline and topline of a line of text tend to have more black and to incorporate into the profile information about whether there are nearby lines, a window over adjacent values can be used. The topline of a line of text is located at the top of the letters without ascenders, and the baseline is located at the bottom of the letters without descenders. A window is used in a signal processing sense. A window is a function that is zero outside a given region. Thus when a window is applied, it selects a number of adjacent values. Smoothing of the profile can also be performed, for example, by using a median filter, to minimize noise when identifying dips.

A user can also specify the placement of a crease. The exact location of the crease can be determined by selecting the nearest dips in the corresponding projection profile. If there are multiple dips within a width of a user's finger tip then the dip with the minimum projection profile value would be selected. The depth of the dip, which is the difference between the dip minimum (minimum value in the dip) and adjacent maxima (first maximum, i.e. peak, value adjacent to the dip minimum), can be incorporated when scoring candidate dips. Because there is more than one candidate dip, the candidate dips are scored to identify the "best" one. The features for computing a score can include the depth of the dip.

The dip locations can be used to show recommended crease locations and the user can select from the recommended crease locations or the user can adjust the locations of the recommended crease locations.

As shown in FIG. 19, image analysis algorithms can be used to compute fold and crease locations on a document. If a document to be displayed contains two-columns of text, an image analysis algorithm can be implemented to place a vertical fold between the two-columns of text. By computing the folding locations, a user can perform simplified folding operations.

Figure 20:
FIG. 20 illustrates an implementation of photograph folding according to an exemplary embodiment.

FIG. 20 illustrates an implementation of folding a photograph 2001 according to an exemplary embodiment. Specifically, the photograph is folded according to object detection and image segmentation algorithms. The objection detection and image segmentations can be performed according to methods known in the art. Therefore, as illustrated in FIG. 20, if the user would like to fold the photograph at a region containing faces, for example, a face detection algorithm can be used to compute the face regions and the photograph can be grouped according to regions containing a face and regions which do not contain a face. The photograph could then be folded accordingly.

Although methods for determining crease locations in documents have been discussed, the locations for creases do not have to be computed and can be selected by a user. A user can specify where a crease is to be located. Referring to FIG. 18, at step 1802, sections of a document can be determined by user interaction.

Allowing a user to specify the crease location of a fold offers more freedom in determining crease locations. If implementing the AS gesture model, a first finger can point to the crease location and a second finger folds the section about the indicated crease. The crease can be determined by taking the line through the first finger that is normal to the direction of motion of the second finger. The motion of the second finger determines a line L2. There are various lines that can go through the first finger at different angles, but only one of these, L1, is normal (i.e. perpendicular) to the line L2. If implementing the SP gesture model, the mid-point of the contact points of two fingers can specify the crease location. There exists a unique line segment connecting the two fingers' contact points, and the midpoint is the point in the middle of this line segment. When implementing either the AS or SP gesture model, the orientation of the crease can be snapped to be either horizontal or vertical. Because finger tips are not very precise (unlike a stylus with a sharp tip), it is difficult for the user to specify a crease that is either perfectly horizontal or vertical. To deal with this, if the specified crease is within a certain threshold (e.g. 5 degrees) of being horizontal or vertical, the crease will be snapped (or rounded off) to horizontal or vertical.

If more than two touch points are supported in a system, more precise gestures can be used to create a crease and perform a fold. For example, in the AS model, two fingers of the non-dominant hand can indicate the location and orientation, since the line between the two fingers create a unique line, and a third finger on the dominant hand can perform the folding action.

Although as discussed above, the creation of the crease is performed when a folding operation is to be performed, the creation of crease locations can be determined separate from the folding operation. Specifically, creases which have been created for a document or created for particular types of documents, can be saved and re-used in later folding operations. However, this may be incompatible with a Translate gesture, and the Translate gesture must be escaped using a mode or temporal attribute of the gesture. The Translate gesture is a standard gesture. When the user touches an object and drags it, the object moves in the direction of the finger. In other words, it performs a "translation" operation. Since a crease-making drag gesture is identical to the Translate gesture (if it is support by the system), an additional mechanism is required to distinguish them, such as using a mode or temporal attribute. A Pinch gesture performs a "scale" operation.

Another gesture to create a crease is the Dot-dot-dot gesture. This is suggestive of a dotted line. The Dot-dot-dot gesture is produced by making, for example, three taps along a line within a short period of time. This gesture is compatible with the Translate gesture. Two gestures are incompatible if they cannot be distinguished (i.e. they have the same shape and other attributes). The Translate gesture path is a continuous line segment, while the Dot-dot-dot gesture is not, therefore, they are compatible.

The user interaction can also work in combination with, for example, the pre-computation. The pre-computed crease locations would snap to a nearby section boundary pre-computed by image analysis algorithms based on a crease location selected by a user.

FIG. 18, at step 1803 describes highlighting creases. Creases can be highlighted to enhance feedback during interaction. When the user is making a multi-touch fold gesture, as soon as the system recognizes that a fold gesture is in process, the crease can be highlighted. Highlighting can be achieved by rendering the crease in a different color, or painting additional color on the crease.

Although pre-computing sections, user interaction and highlighting creases are described for determining creases and sections, the invention is not limited to this and any method of determining a crease or section can be used.

Figure 21:
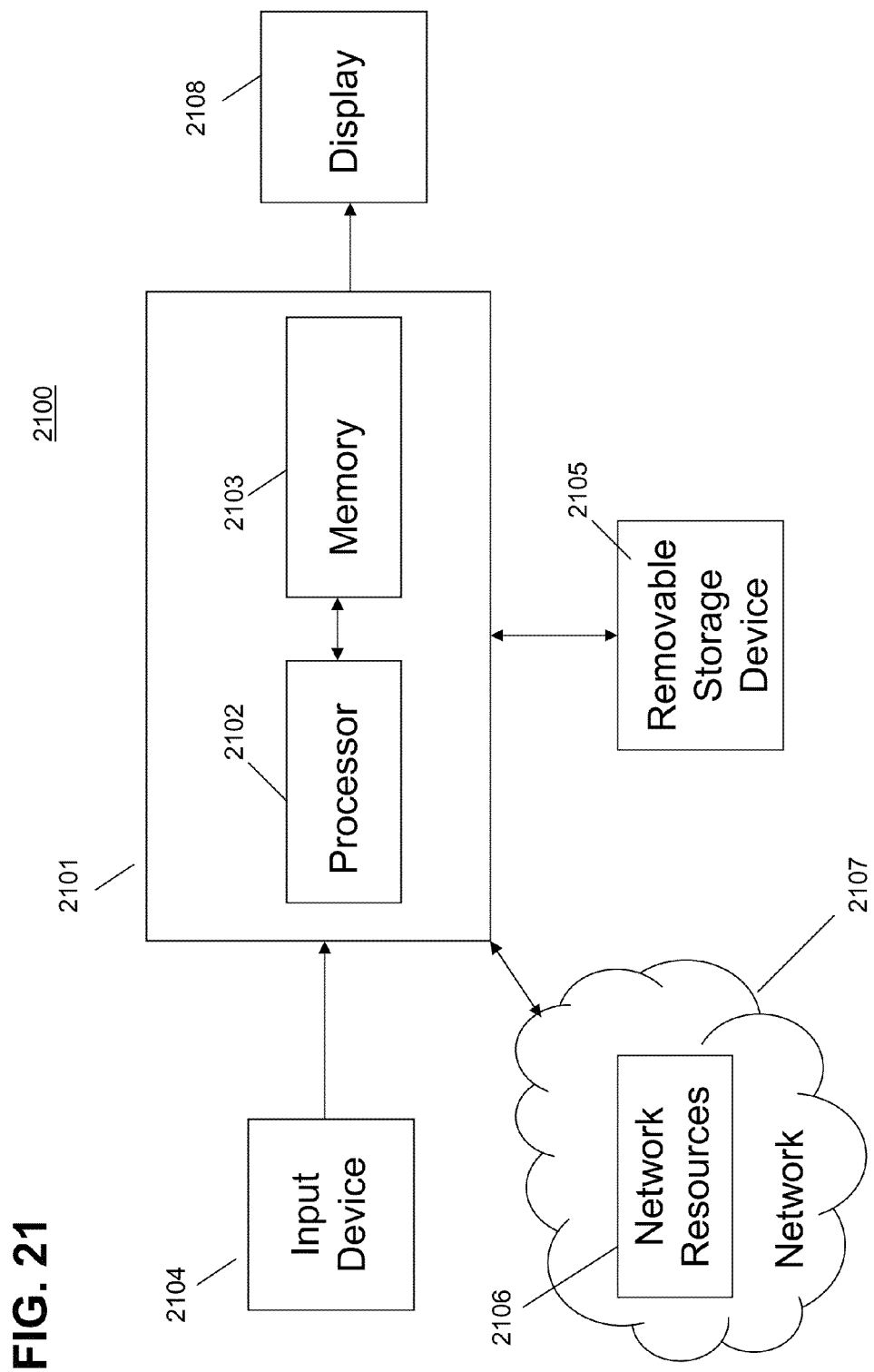
FIG. 21 is a block diagram of a computer system upon which the system may be implemented.

FIG. 21 is a block diagram that illustrates an embodiment of a computer/server system 2100 upon which an embodiment of the inventive methodology may be implemented. The system 2100 includes a computer/server platform 2101 including a processor 2102 and memory 2103 which operate to execute instructions, as known to one of skill in the art. The term "computer-readable storage medium" as used herein refers to any tangible medium, such as a disk or semiconductor memory, that participates in providing instructions to processor 2102 for execution. Additionally, the computer platform 2101 receives input from a plurality of input devices 2104, such as a keyboard, mouse, touch device or verbal command. The computer platform 2101 may additionally be connected to a removable storage device 2105, such as a portable hard drive, optical media (CD or DVD), disk media or any other tangible medium from which a computer can read executable code. The computer platform may further be connected to network resources 2106 which connect to the Internet or other components of a local public or private network. The network resources 2106 may provide instructions and data to the computer platform from a remote location on a network 2107. The connections to the network resources 2106 may be via wireless protocols, such as the 802.11 standards, Bluetooth® or cellular protocols, or via physical transmission media, such as cables or fiber optics. The network resources may include storage devices for storing data and executable instructions at a location separate from the computer platform 2101. The computer interacts with a display 2108 to output data and other information to a user, as well as to request additional instructions and input from the user. The display 2108 may therefore further act as an input device 2104 for interacting with a user.

The embodiments and implementations described above are presented in sufficient detail to enable those skilled in the art to practice the invention, and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

Therefore, the exemplary embodiments of the invention provide a more efficient construction of the underlying 3D mesh geometry objects. Depending on the target applications, requirements of the user, system capabilities, and compatibility requirements, specific interaction techniques can be designed using the gesture models, mappings and crease determination methods. The exemplary embodiments enable a more direct and expressive interaction employing a multi-touch display for folding documents in a 3D visualization.

As opposed to the current art, the 3D page objects are more dynamic and do not require a fixed geometric structure with changeable content rendered on the structure. Also, the folding can be performed on the objects in the document, and not merely on the spaces. Therefore, an exemplary embodiment allows a user to fold documents according to a desired document visualization.

Although a few embodiments have been shown and described, it will be appreciated by those skilled in the art that changes may be made in these various embodiments without departing from the principles and spirit of the inventive concept, the scope of which is defined in the appended claims and their equivalents.

What is claimed is:

1. A method for folding a document page object in a graphical user interface using multi-touch gestures comprising:
    establishing at least two contact points on a display;
    moving at least one of the at least two contact points to fold the document page object; and
    displaying the folded document page object,
    wherein the multi-touch gestures control the folding of the document page object according to gesture models that indicate whether the at least two contact points are interpreted symmetrically or asymmetrically and a gesture mapping that maps the moving of the symmetrically or asymmetrically interpreted at least one of the at least two contact points to the folding of the document page,
    wherein the gesture models comprise a Symmetric-Parallel (SP) gesture model and an Asymmetric-Serial (AS) gesture model,
    wherein the AS gesture model comprises gestures which maintain a first contact point established by a first finger which is in a fixed position while moving a second contact point established by a second finger from a first position to a second position,
    wherein the first finger is interpreted as a finger of a non-dominant hand which is in the fixed position while the second contact point is moved by the second finger, and wherein the second finger is interpreted as a finger of a dominant hand which moves the second contact point from the first position to the second position.

2. The method according to claim 1, wherein the at least two contact points are established by hands of a user; and
    wherein the SP gesture model comprises gestures which move the at least two contact points established by the hands of the user so that the hands have symmetric roles to each other and the moving of any of the at least two contact points are interpreted in a same way.

3. The method according to claim 1, wherein the gesture mapping comprises at least one of a Logical gesture mapping, a Directional gesture mapping, and a Contact Point Constrained (CPC) gesture mapping.

4. The method according to claim 3, wherein in the Logical gesture mapping an amount of movement of a gesture perpendicular to a projection of an intersecting edge is mapped to a fold angle.

5. The method according to claim 3, wherein in the Directional gesture mapping a fold direction is based on a movement of the at least two contact points toward each other or away from each other.

6. The method according to claim 3, wherein in the CPC mapping, the at least two contact points correspond to points on two sections of a document and the sections underneath the at least two contact points follow a movement of a user's fingers.

7. The method according to claim 1, wherein the folding is performed in a determined crease location.

8. The method according to claim 7, wherein the crease location is determined by at least one of heuristics, content analysis algorithms, and user interaction.

9. The method according to claim 1, wherein all content on the document page object remains visible after the document page object is folded.

10. A method for performing document visualization using interactive multi-touch folding gestures comprising:
    determining gesture models which specify folding actions for a document page object according to user manipulation of a display;
    determining a gesture mapping which maps gesture path events for the visualization of the document page object;
    folding the document page object according to the determined gesture models and gesture mapping; and
    displaying the folded document page object,
    wherein the gesture models comprise a Symmetric-Parallel (SP) gesture model and an Asymmetric-Serial (AS) gesture model,
    wherein the AS gesture model comprises gestures which maintain a first contact point established by a first finger which is in a fixed position while moving a second contact point established by a second finger from a first position to a second position,
    wherein the first finger is interpreted as a finger of a non-dominant hand which is in the fixed position while the second contact point is moved by the second finger,
    and wherein the second finger is interpreted as a finger of a dominant hand which moves the second contact point from the first position to the second position.

11. A system for folding a document page object in a graphical user interface using multi-touch gestures comprising:
    a processor with a memory;
    a gesture model unit which determines gesture models which specify whether inputs for performing folding actions for a document page object according to user manipulation of a display are interpreted symmetrically or asymmetrically;

a gesture mapping unit which determines a gesture mapping which maps symmetrically or asymmetrically interpreted gesture path events for the visualization of the document page object, wherein the processor executes instructions to fold the document page object according to the determined gesture models and gesture mapping;

a display for displaying the folded document page object;

wherein the gesture models comprise a Symmetric-Parallel (SP) gesture model unit and an Asymmetric-Serial (AS) gesture model unit, wherein the AS gesture model unit determines whether a first contact point is established by a first finger which is in a fixed position while determining movement of a second contact point established by a second finger from a first position to a second position, wherein the first finger is interpreted as a finger of a non-dominant hand which is in the fixed position while the second contact point is moved by the second finger, and wherein the second finger is interpreted as a finger of a dominant hand which moves the second contact point from the first position to the second position.

12. The system according to claim 11, wherein at least two contact points are established by hands of a user; and wherein the SP gesture model unit determines movement of the at least two contact points established by the hands of the user so that the hands have symmetric roles to each other and interprets the moving of any of the at least two contact points in the same way.

13. The system according to claim 11, wherein the gesture mapping unit comprises one of a Logical gesture mapping unit, a Directional gesture mapping unit, and a CPC gesture mapping unit.

14. The system according to claim 13, wherein the Logical gesture mapping unit determines an amount of movement of a gesture perpendicular to a projection of an intersecting edge which is mapped to a fold angle.

15. The system according to claim 13, wherein the Directional gesture mapping unit determines a fold direction based on a movement of at least two contact points toward each other or away from each other.

16. The system according to claim 13, wherein the CPC gesture mapping unit determines whether at least two contact points correspond to points on two sections of a document and whether the sections underneath the at least two contact points follow a movement of a user's fingers.

17. A computer program product for folding a document page object in a graphical user interface using multi-touch gestures, the computer program product embodied on a non-transitory computer readable medium and when executed by a computer, performs a method comprising:

establishing at least two contact points on a display;

moving at least one of the at least two contact points to fold the document page object; and displaying the folded document page object, wherein the multi-touch gestures control the folding of the document page object according to gesture models that indicate whether the at least two contact points are interpreted symmetrically or asymmetrically and a gesture mapping that maps the moving of the symmetrically or asymmetrically interpreted at least one of the at least two contact points to the folding of the document page, wherein the gesture models comprise a Symmetric-Parallel (SP) gesture model and an Asymmetric-Serial (AS) gesture model, wherein the AS gesture model comprises gestures which maintain a first contact point established by a first finger which is in a fixed position while moving a second contact point established by a second finger from a first position to a second position, wherein the first finger is interpreted as a finger of a non-dominant hand which is in the fixed position while the second contact point is moved by the second finger, and wherein the second finger is interpreted as a finger of a dominant hand which moves the second contact point from the first position to the second position.

* * * * *